US005169349A

United States Patent [19]

Hilbert

[11] Patent Number: 5,169,349

[45] Date of Patent: Dec. 8, 1992

[54] WIRE PASSAGE

[76] Inventor: Robert L. Hilbert, W7499 Rogersville Rd., Fond du Lac, Wis. 54935

[21] Appl. No.: 724,594

[22] Filed: Jul. 1, 1991

[51] Int. Cl.[5] .................... B60L 11/02

[52] U.S. Cl. .................... 440/6

[58] Field of Search .................... 440/1, 2, 78, 67; 114/144 E; 248/288.5, 291, 278, 229; 43/26.1, 27.4

[56] References Cited

U.S. PATENT DOCUMENTS 2,429,774 10/1947 Schultz et al. .................... 440/6

3,880,106 4/1975 Farmer .................... 248/229

4,152,690 5/1979 Veatch .................... 248/278

*Primary Examiner*—Jesus D. Sotelo

*Attorney, Agent, or Firm*—Donald Cayen

[57] ABSTRACT

Electric trolling apparatus is provided with a passage that protects a wire of a sonar unit and that also eliminates excess wire between a sonar transducer fastened to a trolling motor and a sonar control unit in a boat. The passage is defined by a tube inserted inside a trolling apparatus post and an electrical junction box secured to the post. One end of the tube protrudes through the trolling apparatus post and motor hub with a watertight connection. The tube second end emerges through the electrical junction box with another watertight connection. The wire passes through the tube and out its two ends without exposing the interiors of the post or junction box to water. The tube may be one long piece or two shorter pieces joined end-to-end with a watertight connection.

8 Claims, 2 Drawing Sheets

WIRE PASSAGE

BACKGROUND OF THE INVENTION

1. Field of the Invention

This invention pertains to water related sports equipment, and more particularly to apparatus associated with fishing.

2. Description of the Prior Art

A common method of fishing is to slowly troll a boat and trail a fish line and bait behind in the water. Quiet low power electric motors and controls, such as are manufactured by the Minn Kota Company of Mankato, Minnesota, have been developed for that purpose.

FIG. 1 shows a typical electric trolling apparatus 1 that includes a housing 3 mounted at any convenient location to a boat 5. A block 7 is supported in the housing 3 for pivoting about a horizontal axis 9. The block 7 receives a long tube 11. The tube 11 is free to slide within the block in the directions of the tube longitudinal axis 13 and is also free to rotate about that axis. Attached to the lower end of the tube 11 with a watertight connection is an electric motor 15. A junction box 17 is secured with a watertight connection to the upper end of the tube. A collar 19 is slidable along the tube and may be clamped at any desired location thereon by a locking knob 21. The collar 19 rests on the block to limit gravity induced sliding of the tube and thus controls the depth of the motor 15 under the water surface, as, for example, to the depth shown in phantom lines 15*a*. A lever, not shown, controls locking of the block to the housing such that the tube is either vertically oriented as shown in the solid lines 11 and vertical phantom lines 11*a* or in the horizontal orientation shown in the phantom lines 11*b*.

Control and power wires for the motor 15 are enclosed in a waterproof fashion inside the tube 11 between the motor and the junction box 17. From the junction box, the wires are encased in a sheath 23 and are led outside the trolling apparatus 1 to a second electrical box 25 on the housing 3. The sheath 23 and the wires encased in it are coiled so as to enable the tube to be slid along its full length and to be rotated about its longitudinal axis within the block 7 and to enable the block to be tilted in the housing 3 about axis 9 without causing the sheath to tangle.

To aid fishermen locate fish while trolling, it is known to employ underwater sonar systems. To use a sonar system with typical trolling apparatus 1, a transducer 27 may be fastened to a bracket 29 that in turn is welded or otherwise joined to the motor 15. A wire 31 from the transducer 27 leads to a control unit 33 in the boat 5.

A problem invariably arises in connection with the wire 31 between the sonar transducer 27 on the motor 15 and the sonar control unit 33 in the boat 5. The wire 31 must be long enough to allow the motor to be placed in its lowermost position, typically represented by phantom lines 15A, relative to the housing 3. For any other position of the motor, the length of the wire 31 is excessive, and there is a constant tendency for the wire to be dragged in the water and get caught in the propeller 35. Pulling the excess wire into the boat and away from the propeller 35 increases the probability that the wire will become tangled inside the boat. Excess wire inside the boat is especially a problem when the motor and tube are tilted up out of the water and the motor is slid close to the housing, as is shown at reference numerals 11B and 15B. In that position, almost the entire length of the sonar wire is inside the boat and prone to damage. The sonar wire 31 may be taped to the junction box 17 to take up some of the slack, but that is a temporary and generally unsatisfactory solution.

Thus, a need exists for improvements in the management of the wires associated with a fishing sonar unit.

SUMMARY OF THE INVENTION

In accordance with the present invention, a wire passage is provided that protects the wire leading from a sonar transducer on an outboard motor to a sonar control unit in a boat. This is accomplished by apparatus that includes a continuous enclosed passage extending from proximate the transducer to a location conveniently near the sonar control unit.

The passage for the sonar wire is preferably in the form of an elongated tube having first and second open ends. A first portion of the tube is installed in the interior of a hollow post that attaches to and supports the outboard motor at the post lower end. In turn, the post is slidable and pivotable within a housing mounted to the boat.

The first end of the passage defining tube protrudes through an opening in the post near the attachment location of the post with the motor. The opening between the post and the tube is watertight so that no water can enter the interior of the post, although water can enter the interior of the tube. The second portion of the tube is installed within an electrical junction box at the upper end of the post, and the tube second end emerges from the junction box.

The sonar wire passes completely through the tube passage. One end of the wire passes out the tube first end near the outboard motor and is connected to the sonar transducer. The wire second end passes out the tube second end at the electrical junction box and leads to the sonar control unit in the boat. In that manner, the sonar wire is protected within the post and junction box for a great portion of its overall length, and the amount of the excess wire required in the boat to accommodate the range of positions of the motor relative to the boat is greatly reduced. Although water can enter the tube during use, the water drains harmlessly out either or both tube ends when the motor is taken out of the water after fishing is completed.

Other advantages, benefits, and features of the invention will become apparent to those skilled in the art upon reading the detailed description of the invention.

DETAILED DESCRIPTION OF THE PREFERRED EMBODIMENT

Although the disclosure hereof is detailed and exact to enable those skilled in the art to practice the invention, the physical embodiments herein disclosed merely exemplify the invention, which may be embodied in other specific structure. The scope of the invention is defined in the claims appended hereto.

Figure 3:
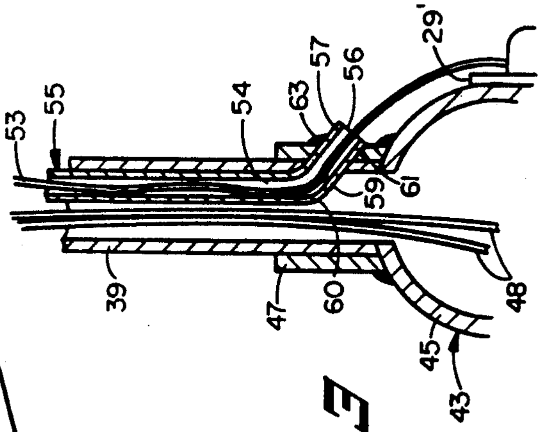
FIG. 3 is an enlarged cross sectional view taken along lines 3—3 of FIG. 2.
Figure 1:
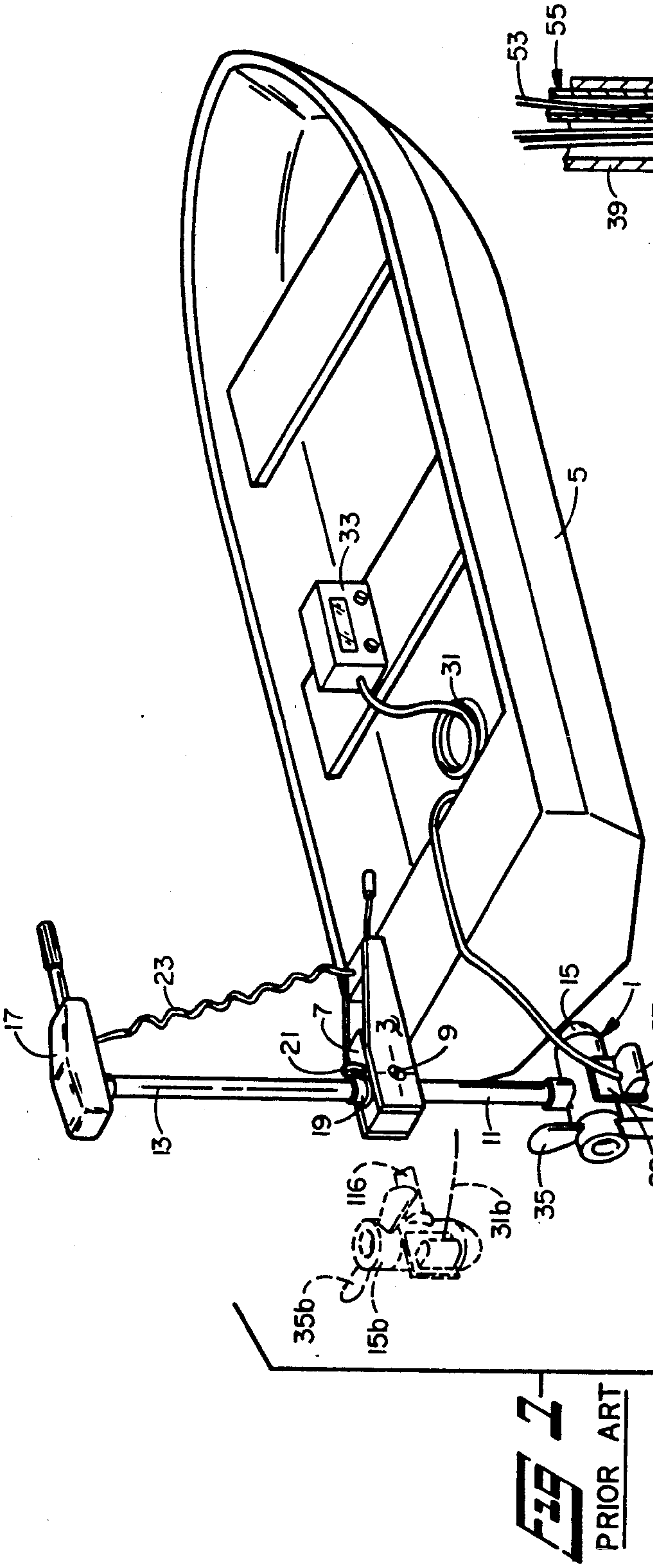
FIG. 1 PRIOR ART
FIG. 1 is a perspective view of a prior installation of a sonar unit in a fishing boat.
Figure 2:
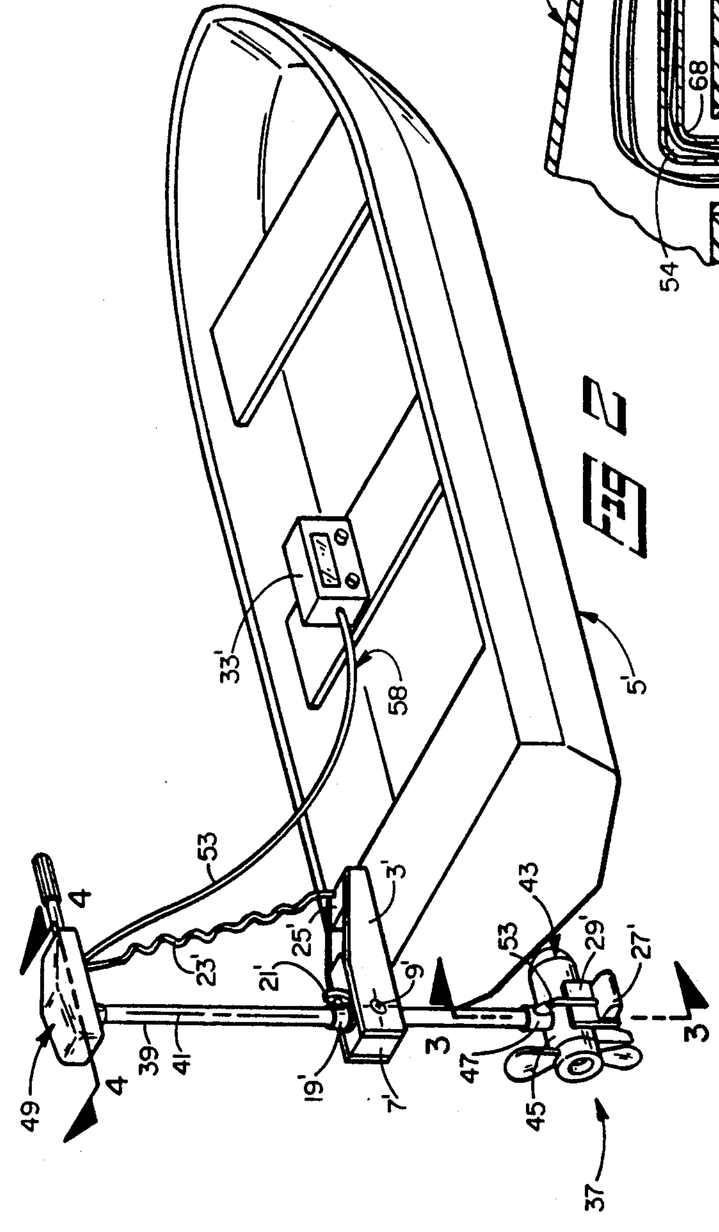
FIG. 2 is a perspective view of a sonar unit installed in a fishing boat using the wire passage of the present invention.
Figure 4:
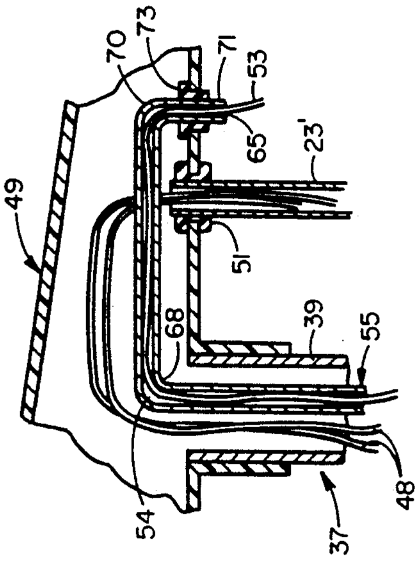
FIG. 4 is an enlarged cross sectional view taken along lines 4—4 of FIG. 2.

Referring to FIGS. 2–4, an electric trolling apparatus 37 is illustrated that includes the present invention. The electric trolling apparatus is useful for slowly propelling a fishing boat 5', but it will be understood that the invention is not limited to fishing applications.

The electric trolling apparatus 37 is comprised of a housing 3' that mounts by suitable means, not shown, to any convenient structure on the boat 5'. A block 7' is pivotable within the housing 3' about horizontal axis 9', as is known in the art. A post 39 is freely slidable along its longitudinal axis 41 within the block 7', and the post is also freely rotatable about its longitudinal axis. A collar 19' with locking knob 21' adjustably limits the descent of the post 39 into the water.

To the lower end of the post 39 is attached an electric motor 43. The motor 43 includes a casing 45 and an annular hub 47. Attachment of the post to the motor 43 is through a watertight connection with the hub 47. Electric wires for the motor, which are typically represented by reference numerals 48, run from the motor casing 45 up the post 39 to a junction box 49 at the top of the post. The motor wires 48 enter a coiled sheath 23', which passes through a watertight grommet 51 to a second electrical box 25, on the housing 3, In accordance with the present invention, a wire passage 54 is provided through the electrical trolling apparatus 37 for a wire 53 of a sonar unit 58. The sonar unit 58 includes a transducer 27', a control unit 33', and a wire 53 connected between the transducer and the control unit. Typically, the sonar transducer 27' is fastened to a bracket, such as is depicted at reference numeral 29', that in turn is welded or otherwise joined to the motor casing 45.

In the illustrated construction, the wire passage 54 is defined by an elongated rigid tube 55 placed inside the post 39 and the junction box 49. The tube 55 is bent at an obtuse angle at reference numeral 60 near a first tube end 57. The tube first end 57 protrudes through a hole 59 in the post and through an aligned hole 61 in the motor hub 47. The tube first end 57 is welded to the hub with a continuous circumferential weld 63 that provides a watertight connection between the outside of the hub and the tube. The passage 54 terminates in a first outlet 56 at the tube first end.

The passage 54 continues uninterrupted between its first outlet 56 and a second outlet 65. For that purpose, the tube 55 extends up the post 39 and through the electrical junction box 49 at the top of the post. The tube 55 is bent with two 90 degree bends 68 and 70 located within the junction box 49. The second end 71 of the tube is gripped with a watertight fitting 73 at its point of emergence from the junction box.

The sonar wire 53 is led from the transducer 27' to the first outlet 56, through the passage 54, and to the passage second outlet 65 of the tube 55. In that manner, the sonar wire 53 can remain permanently with the trolling apparatus 37, and the wire is protected for a great portion of its length between the sonar transducer 27' and the control unit 33'. At the same time, the amount of excess wire in the boat 5' is greatly reduced compared with a prior electric trolling apparatus 1 without the wire passage. Water entering the passage causes no harm, because the water is unable to reach the interior of the post 39 or the motor 43. Further, all water in the passage quickly drains out when the boat 5' is pulled from the water or when the block 7' is pivoted about the housing 3' to place the post in a horizontal attitude.

Figure 5:
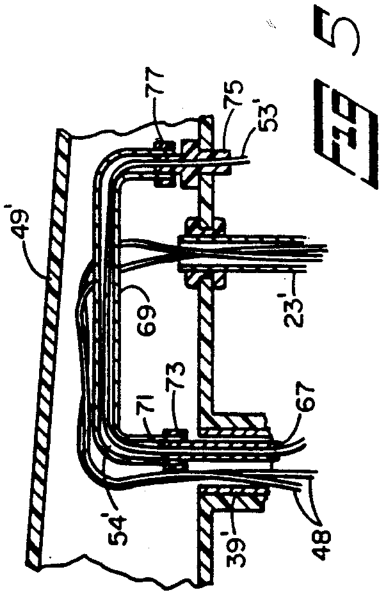
FIG. 5 is a view similar to FIG. 4, but showing an alternate construction of the wire passage of the present invention.

The tube that defines the wire passage according to the present invention may be a single continuous rigid length between its opposite ends, as shown by the tube 55 of FIG. 4. In FIG. 5, an alternate construction is shown in which the passage 54' is defined by a relatively long length of rigid tubing 67 and a shorter length of flexible tubing 69. The portion of the rigid tubing 67 inside the electrical trolling apparatus post 39' of FIG. 5 may be identical to the portion of the tubing 55 inside the post 39 of FIGS. 3 and 4. However, the tubing 67 terminates in an end 71 in the junction box 49' without any bends inside the junction box. One end of the flexible tube 69 is fit snugly over the rigid tubing end 71 with a clamp 73. The second end of the flexible tubing is fit over a fitting 75 with a clamp 77. The fitting 75 provides a watertight connection to the interior of the junction box 49'. The passage 54' defined by the combination of the rigid and flexible tubes functions in the same way as the passage 54 to protect the sonar wire 53' and to eliminate excessive wire within the boat 5'.

Thus, it is apparent that there has been provided, in accordance with the invention, a wire passage that fully satisfies the aims and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:

1. Electrical trolling apparatus comprising:

a. an elongated hollow post having upper and lower ends;

b. a motor having an interior and a hollow hub that is attached to the post lower end, the interior of the motor being in communication with the interior of the post;

c. an electrical junction box secured to the post upper end;

d. housing means for slidingly receiving the post; and e. passage means extending through the interior of the post and junction box for enabling a portion intermediate opposite ends of an elongated wire located generally outside of the electric trolling apparatus to pass through and be protected inside the post and junction box.

2. The electric trolling apparatus of claim 1 wherein the passage means is defined by a tube having a first end that protrudes through the post and motor hub with a watertight connection and a second end that emerges from the junction box with a watertight connection, so that the interior of the tube may be exposed to water and water is prevented from entering the interiors of the motor, post, and junction box.

3. The electric trolling apparatus of claim 1 wherein the passage means is defined by a first tube having a first end that protrudes through the post and motor hub with a watertight connection therewith and a second end located in the junction box, and by a second tube having a first end joined to the first tube second end with a watertight connection and a second end that emerges from the junction box with a watertight connection therewith, so that the interiors of the first and second tubes may be exposed to water and water is prevented from entering the interiors of the motor, post, and junction box.

4. In combination with electric trolling apparatus having a motor with a hub, a hollow post having a longitudinal axis and a wall and being attached at one end thereof to the motor hub with a watertight connection, and a junction box secured to the post second end, a tube having first and second open ends and extending through the post and junction box, the tube first end protruding through the post wall and the motor hub at an angle to the post longitudinal axis with a watertight connection with the motor hub, and the tube second end emerging through the junction box with a watertight connection therewith, so that a wire can be protected within the tube and pass out the first and second ends thereof.

5. In combination with electric trolling apparatus having a motor, a hollow post attached at one end thereof to the motor with a watertight connection, and an electrical junction box secured to the post second end, a first tube having a first end within the junction box and a second end that protrudes with a watertight connection through the post proximate the motor, and a second tube having a first end that connects with a watertight connection with the first end of the first tube and a second end that emerges through the junction box with a watertight connection, so that a wire can be received within the first and second tubes and pass out the second end of the first tube and out the second end of the second tube.

6. Apparatus for propelling a boat comprising:

a. a motor;

b. a post having an interior, a first end attached to the motor with a watertight connection, and a second end;

c. block means for mounting the post to the boat;

d. a junction box having an interior and being secured with a watertight connection to the post second end; and e. passage means inside the post and junction box for enabling a selected wire that is exposed to water to pass through the post and junction box without exposing the interior of the post and junction box to the water.

7. The apparatus of claim 6 wherein the passage means comprises a tube having a first end that protrudes through the post with a first connection that prevents water from entering the post interior and a second end that emerges through the junction box with a second connection that prevents water from entering the junction box interior.

8. The apparatus of claim 6 wherein the passage means comprises:

a. a first tube having a first end that protrudes through the post with a first connection that prevents water from entering the post interior and a second end; and b. a second tube having a first end joined with a watertight connection to the first tube second end and a second end that emerges through the junction box with a second connection that prevents water from entering the junction box interior.

* * * * *